United States Patent [19]

Woods et al.

[11] Patent Number: 4,492,392
[45] Date of Patent: Jan. 8, 1985

[54] TANK FITTING

[75] Inventors: Arthur F. Woods, Monroe, La.; Harry Bush, St. Louis, Mo.; Eugene J. Kana, Pittsburgh, Pa.

[73] Assignee: Poly Processing Company, Inc., Monroe, La.

[21] Appl. No.: 459,235

[22] Filed: Jan. 19, 1983

[51] Int. Cl.³ .............................................. F16L 5/02
[52] U.S. Cl. .................... 285/119; 285/158; 285/192; 285/205
[58] Field of Search .............. 285/192, 158, 200, 205, 285/206, 119

[56] References Cited

U.S. PATENT DOCUMENTS

| | | | |
|---|---|---|---|
| 636,775 | 11/1899 | Edwards | 285/206 |
| 1,017,899 | 2/1912 | Nagel | 285/192 X |
| 1,127,483 | 2/1915 | Meinecke | 285/206 |
| 1,689,575 | 10/1928 | Winn | 285/205 X |
| 2,366,442 | 1/1945 | Cunningham | 285/200 |
| 2,438,412 | 3/1948 | Morris | 285/206 X |
| 2,459,752 | 1/1949 | Wilson et al. | 285/200 |
| 2,594,599 | 4/1952 | Uhri | 285/192 X |
| 2,943,870 | 7/1960 | Davis | 285/200 |
| 3,531,142 | 9/1970 | Peasley | 285/206 X |
| 4,249,758 | 2/1981 | Harris | 285/158 |

FOREIGN PATENT DOCUMENTS 187072 10/1922 United Kingdom ............... 285/206

Primary Examiner—Thomas F. Callaghan
Attorney, Agent, or Firm—Brady, O'Boyle & Gates

[57] ABSTRACT

A three flanged polyolefin tank fitting wherein two of the flanges are integrally connected to a pipe having a threaded portion one one end thereof, one flange being connected to the opposite end of the pipe and another flange being positioned between the threaded end portion and the first-mentioned flange. The third flange consists of a flange connector having axially extending bolts extending through the second flange. The inner faces of the second and third flanges are provided with compressible gaskets, and a siphon drain is connectable to the threaded end of the pipe.

1 Claim, 4 Drawing Figures

TANK FITTING

BACKGROUND OF THE INVENTION

Heretofore, tank fittings have been secured to the tanks by welding in order to insure a leak-proof connection. The tanks and associated fittings were usually constructed of metal, such as steel, which made them amenable to welding. With the advent of plastics, particularly high density, cross-linked polyethylene, many tanks are being constructed of plastic since plastic provides a material more durable and less expensive than metal and not subject to corrosion when the tanks are being employed to store acids and alkaline solutions; however, cross-linked polyethylene is not weldable or fusible; accordingly, fittings to be used with the plastic tank have to be mechanically connected to the tank in such a manner so as to provide a leak-proof connection.

After considerable research and experimentation, the tank fitting of the present invention has been devised which can be mechanically connected to a plastic tank to thereby provide a leak-proof connection. The fitting of the present invention comprises, essentially, a three flanged polyolefin fitting wherein two of the flanges are integrally connected to a pipe adapted to extend through the tank wall. The end of the pipe within the tank is provided with a threaded portion to which a siphon drain is connectable. Two flanges are positioned at the opposite end of the pipe with one flange being on the end of the pipe and the other flange being positioned on the pipe between the first-mentioned flange and threaded portion. The third flange consists of a flange connector slidably mounted on the portion of the pipe within the tank and having bolts extending axially from the third flange through the tank wall and second flange and secured thereto by suitable nuts. Compressible gaskets are provided on the inner faces of the second and third flanges with the tank wall extending therebetween.

DESCRIPTION OF THE PREFERRED EMBODIMENT

Figure 1:
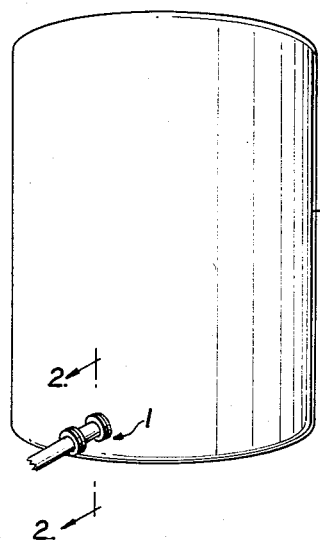
FIG. 1 is a perspective view of the fitting of the present invention mounted on a tank.
Figure 2:
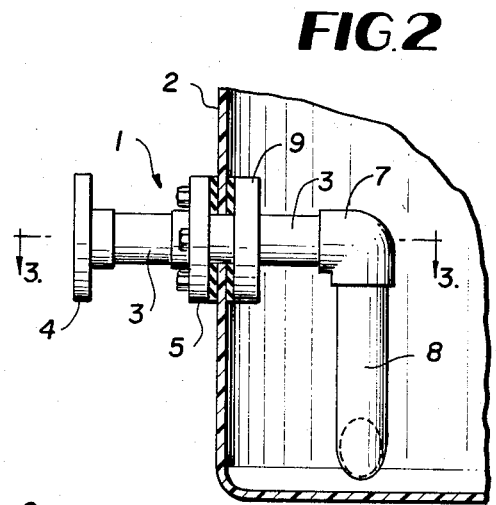
FIG. 2 is a view taken along line 2—2 of FIG. 1.
Figure 3:
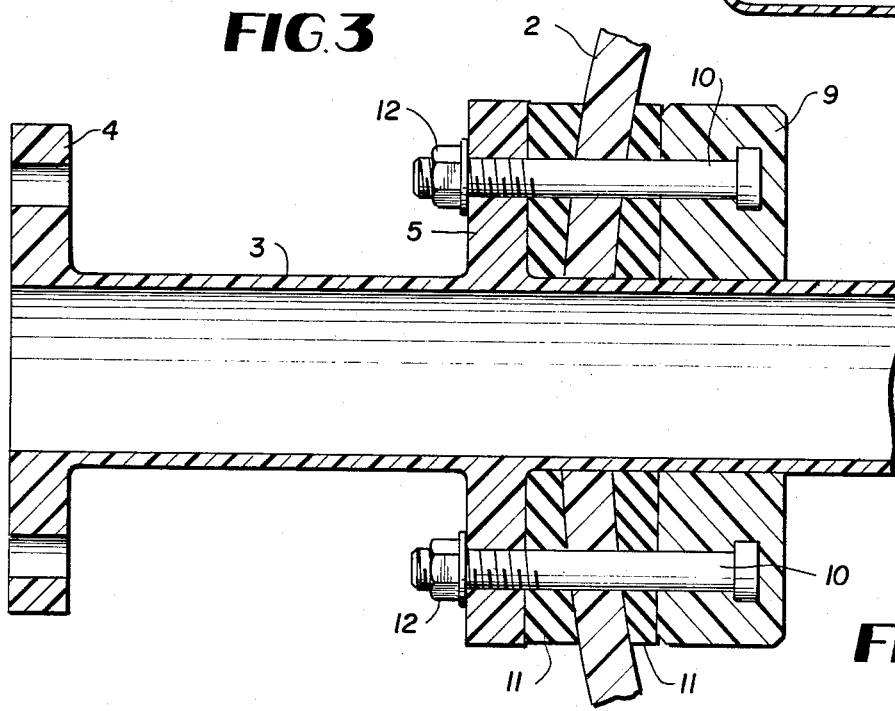
FIG. 3 is a view taken along line 3—3 of FIG. 2.
Figure 4:
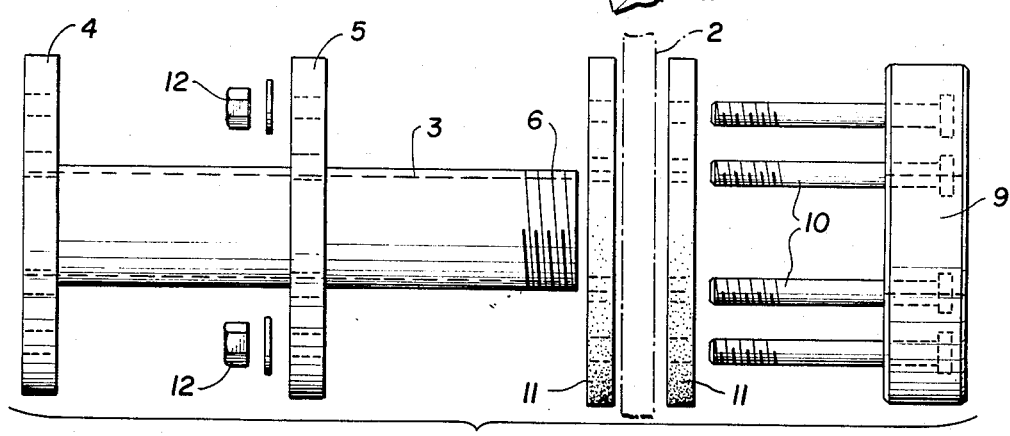
FIG. 4 is an exploded view illustrating the fitting components.

Referring to the drawings and more particularly to FIGS. 1, 2 and 3 thereof, the fitting 1 of the present invention is adapted to be mounted on the side wall of a plastic storage tank 2, the fitting also being made of plastic and comprising a pipe 3 having a pair of flanges 4 and 5 integrally mounted thereon. The end of the pipe 3 opposite from the flange 4 is provided with a threaded portion 6 (FIG. 4) adapted to receive an elbow 7 to which a siphon drain 8 is connected. A third flange 9 is slidably mounted on the portion of the pipe 3 within the tank 2 and is provided with a plurality of bolts 10 which extend axially therefrom. The heads of the bolts 10 are molded within the flange 9 so as not to be attacked by any corrosive fluids which might be stored in the tank. Compressible gaskets 11 are interposed the oppositely extending faces of the flanges 5 and 9 with the wall of the tank 2 extending therebetween. The bolts 10 extend through the gaskets 11 and the wall of the tank 2 and are fastened to the flange 5 by suitable nuts 12. Tightening of the nuts 12 will draw the flanges 5 and 9 toward each other, whereby the gaskets 11 are compressed to thereby conform to the curvature of the tank wall resulting in a leak-proof connection.

Since the compressible gaskets 11 are employed for effecting the leak-proof seal, the flanges 5 and 9 must press against the gaskets 11 in a flush manner, accordingly, the fitting 1 cannot be mounted at the very bottom of the tank side wall to provide a full drain capability. The size of the flanges 5 and 9 require the fitting 1 to be positioned somewhat above the bottom of the tank side wall; therefore, to obtain a better draining of the tank 2, the siphon drain 8 is provided.

To complete the fitting structure, a valve or flanged pipe can be connected to the flange 4.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A tank fitting comprising, a plastic pipe, said pipe extending through a side wall of a cylindrical plastic tank, a plastic flange integrally formed on said pipe in proximity to the exterior curved surface of the tank side wall, another plastic flange slidably mounted on the portion of the pipe within the tank and positioned in proximity to the interior curved surface of the tank side wall, compressible gasket means interposed the exterior surface of the tank side wall and the first-mentioned flange and between the interior surface of the tank side wall and the second-mentioned flange, bolt means extending between said flanges for drawing said flanges toward each other to thereby compress said gasket means axially against the tank side wall to conform the gaskets to the curvature of the tank wall and radially against the pipe to provide a leak-proof connection, the heads of the bolt means being encased within the second-mentioned flange to prevent corrosion of said bolt means; said pipe and associated flanges being positioned in proximity to and above the bottom of the tank side wall, a siphon drain connected to the end of the pipe within the tank to thereby facilitate the draining of the tank; and a third plastic flange integrally formed on the end of the pipe exterior of the tank.

* * * * *